United States Patent [19]
Hirakawa

[11] Patent Number: 5,642,175
[45] Date of Patent: Jun. 24, 1997

[54] COLOR CATHODE RAY TUBE DISPLAY DEVICE AND METHOD OF ELIMINATING THE INFLUENCE OF AN EXTERNAL MAGNETIC FIELD

[75] Inventor: Tatsuhiro Hirakawa, Tokyo, Japan

[73] Assignee: Mitsubishi Denki Kabushiki Kaisha, Tokyo, Japan

[21] Appl. No.: 612,461

[22] Filed: Mar. 7, 1996

[30] Foreign Application Priority Data

Dec. 25, 1995 [JP] Japan ................... 7-337218

[51] Int. Cl.⁶ .................. H04N 9/29; H01J 29/06
[52] U.S. Cl. ................. 348/806; 315/8; 315/370; 348/820; 361/150
[58] Field of Search ................ 348/805, 806, 348/820, 807; 315/8, 85, 370; 361/150; 313/413; H04N 9/29, 9/28, 3/22, 3/26

[56] References Cited

U.S. PATENT DOCUMENTS 5,367,221 11/1994 Santy et al. ................... 315/8
5,488,270 1/1996 Takita et al. ................. 315/370
5,493,179 2/1996 Tanizoe ........................ 315/8

FOREIGN PATENT DOCUMENTS 3-219537 9/1991 Japan.

*Primary Examiner*—Michael H. Lee
*Attorney, Agent, or Firm*—Burns, Doane, Swecker & Mathis, LLP

[57] ABSTRACT

A color cathode ray tube display device comprises a color cathode ray tube including a neck portion (1a), a funnel portion (1b), and a panel portion (1c), a compensating coil (7) which generates a compensating magnetic field for eliminating the influence of an external magnetic field that acts vertically on electron beams which will intersect a display screen of the color cathode ray tube (1), a current supply unit (4,5) for passing a sawtooth current synchronized with the vertical deflection cycle of a video signal into the compensating coil (7) so that the compensating coil generates the compensating magnetic field, and a memory (5b) for storing information about the sawtooth current passing through the compensating coil (7).

8 Claims, 7 Drawing Sheets

COLOR CATHODE RAY TUBE DISPLAY DEVICE AND METHOD OF ELIMINATING THE INFLUENCE OF AN EXTERNAL MAGNETIC FIELD

BACKGROUND OF THE INVENTION

1. Field of the Invention

The present invention relates to a color cathode ray tube display device having a compensating function of effectively eliminating the influence of an external magnetic field which acts in a vertical direction on the display screen of the color cathode ray tube, and a method of eliminating the influence of the external magnetic field.

2. Description of the Prior Art

Such a color cathode ray tube (CRT) for displaying a color image, which is also called Braun tube, has been used for television receivers and the like. The CRT displays images in such a manner as to deflect electron beams emitted from electron guns by means of the magnetic field created by a deflection yoke to scan the electron beams on the screen of the CRT to make phosphorous coating on the screen of the large end of the CRT emit light. Thus, the CRT is susceptible to the influence of an external magnetic field. If an external magnetic field such as the earth's magnetic field or the like acts on the CRT significantly, changes in the positions where the electron beams intersect the phosphor dots on the screen of the CRT occur and hence images cannot be displayed correctly.

A degaussing device disposed in a prior art color cathode ray tube can be effective for compensating for a small amount of change in an external magnetic field which acts in a vertical direction on the screen of the color cathode ray tube. However, in the case of the earth magnetic field, since the directions of the vertical components of the earth's magnetic field in the Northern and Southern Hemispheres are perfectly opposite to each other, such a degaussing device cannot be useful. Thus, in the current state of the art, different types of CRTs, for which different designs (designs of exposure) are respectively carried out according to areas where the CRTs will be used, are manufactured. Additional design works for different areas where CRTs are to be used, accompanied by a new design of a CRT and changeovers to incorporate corresponding deflection lenses into CRTs destined for areas where the CRTs are to be used result in an increase in the cost of manufacturing.

When an external magnetic field acts vertically on such a CRT, the positions of electron beams which intersect the screen of the large end of the CRT are moved parallel in a horizontal direction regardless of where the electron beams intersect within the whole screen of the CRT. However, when an adjustment is made to a CRT destined for the Northern Hemisphere by means of a compensating magnetic field used for CRTs destined for the Southern Hemisphere, the horizontal travels of the electron beams differ according to whether they intersect a central region of the screen or an upper or lower region of the screen, which depend on the structure of the degaussing device; the horizontal movement of the electron beams which intersect the upper or lower region of the screen is larger than those of the electron beams which intersect the central part of the screen.

Thus, there remain large horizontal movements of the electron beams within the upper or lower region of the screen of the CRT due to the influence of the external magnetic field when an adjustment is made properly by means of the purity (the degree of a match regarding position between each of the electron beams and each of corresponding phosphor dots) correction function of the CP-ASSY disposed in the prior art CRT and used for the convergence and purity adjustments in such a manner that the electron beams intersect the corresponding phosphor dots in the central part of the screen of the CRT precisely so that the phosphor dots are respectively overlaid with the electron beam spots.

Accordingly, as shown in FIG. 8, in the central part of the screen of the color CRT 1, each of the electron beams 8 impinges on the whole of each of the corresponding phosphor dots so as to make the whole of each of the phosphor dots 9 emit light. In contrast, in the upper or lower region of the screen of the CRT 1, each of the electron beams 8 is shifted considerably and hence impinges on only a part of each of the corresponding phosphor dots 9. Thus, only the part of each of the phosphor dots can emit light. As a result, images cannot be displayed properly. In FIG. 8, displacements of one of the electron beams for the three primary colors, red, green and blue are shown for simplicity.

One presently available mechanism for making a correction to vertical deflections of the electron beams 8, disclosed in Japanese Patent Application Laid Open (KOKAI) No. 3-219537, generates an uniform horizontal bipolar magnetic field in synchronization with the vertical deflection current so as to deflect the electron beams 8 in a vertical direction in addition to the main vertical deflection caused by the vertical deflection current. Thus, the deflection mechanism cannot deflect the electron beams 8 which will intersect the upper or lower region of the screen of the CRT 1 in one identical horizontal direction so as to correct displacements of the electron beams from corresponding phosphor dots 9 on the screen of the CRT.

A disadvantage with the currently available color cathode ray tube display devices constructed as mentioned above is that different designs (designs of exposure) need to be respectively carried out for different types of CRTs in accordance with areas where the CRTs will be used, for example, CRTs destined for the Northern and Southern Hemispheres, so as to manufacture them, and hence an increase in the load on the management of components of CRTs which is accompanied by new designs of different types of CRTs and an increase in the number of types of CRTs and changeovers to incorporate corresponding deflection lenses into CRTs destined for areas where the CRTs are to be used result in an increase in the cost of manufacturing.

SUMMARY OF THE INVENTION

The purpose of the present invention is to overcome these disadvantages. More precisely, an object of the present invention is to provide a color cathode ray tube display device in which an additional circuit is incorporated for making a correction to the CRT destined for the Northern Hemisphere (a number of CRTs are destined for the Northern Hemisphere) so as to tailor the CRT for the Southern Hemisphere or equatorial areas, thereby improving component sharing and reducing the load on the management of components, and hence reducing the cost of manufacturing.

Another object of the present invention is to provide a method of eliminating the influence of an external magnetic field acting vertically on electron beams which intersect the display screen of a color cathode ray tube.

In accordance with one aspect of the present invention, there is provided a color cathode ray tube display device comprising: a color cathode ray tube including a neck portion, a funnel portion, and a panel portion; a compensating coil which generates a compensating magnetic field for eliminating the influence of an external magnetic field that acts vertically on electron beams which will intersect a display screen of the color cathode ray tube; a current supply unit for passing a sawtooth current synchronized with a vertical deflection cycle of a video signal into the compensating coil so that the compensating coil generates the compensating magnetic field; and a memory for storing information about the sawtooth current passing through the compensating coil.

In a preferred embodiment, the compensating coil is disposed in the vicinity of the panel portion of the cathode ray tube such that the compensating coil is wound around the panel portion. The compensating coil wound in the vicinity of the panel portion can be attached to the color cathode ray tube. Alternatively, the compensating coil wound in the vicinity of the panel portion can be attached to a box containing the color cathode ray tube therein.

In a preferred embodiment, the compensating coil is disposed in the vicinity of the funnel portion of the cathode ray tube such that the compensating coil is wound around the funnel portion. The compensating coil wound in the vicinity of the funnel portion can be attached to the color cathode ray tube. Alternatively, the compensating coil wound in the vicinity of the funnel portion can be attached to a box containing the color cathode ray tube therein.

In accordance with another aspect of the present invention, there is provided a method of compensating for an external magnetic field acting vertically on electron beams which intersect a display screen of a color cathode ray tube, comprising the steps of: disposing a compensating coil which can generate a compensating magnetic field for eliminating the influence of the external magnetic field; after making convergence and purity adjustments to the cathode ray tube, passing a sawtooth current synchronized with a vertical deflection cycle of a video signal into the compensating coil so that the compensating coil generates the compensating magnetic field so as to exert moving forces act in an identical direction on electron beams which will intersect an upper region and a lower region of the display screen of the color cathode ray tube; moving electron beams which will intersect the upper region and lower region of the display screen of the color cathode ray tube in the same direction by means of the compensating magnetic field, thereby correcting displacements of the electron beams from corresponding phosphor dots on the display screen of the color cathode ray tube; and storing information about the sawtooth current used for the correction into a memory.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
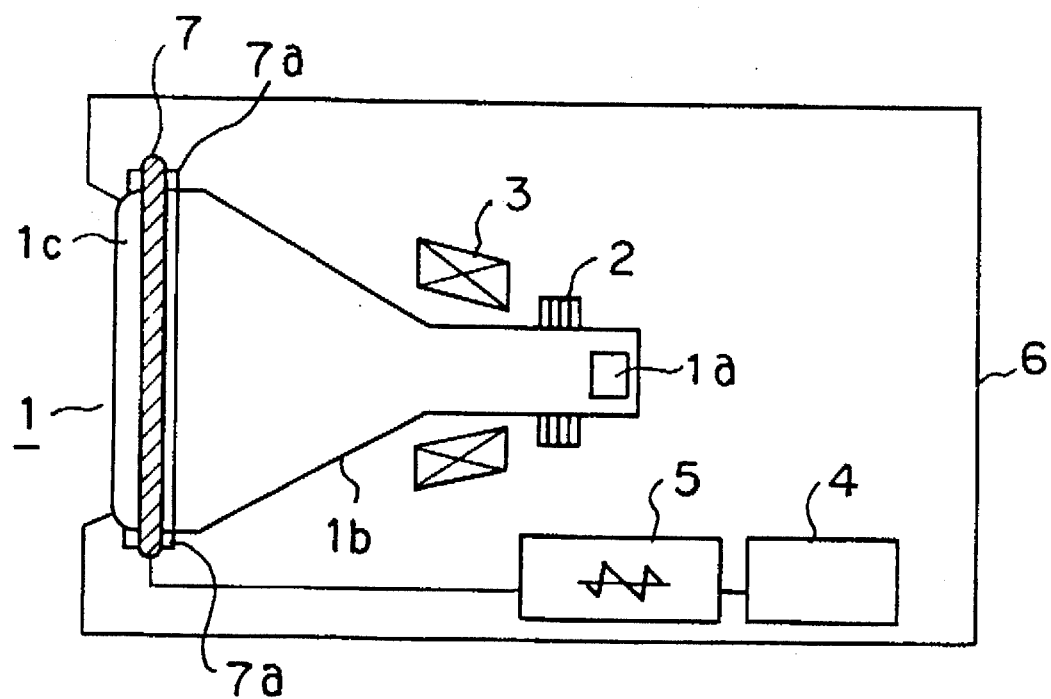
FIG. 1 is a schematic diagram of a color cathode ray tube display device according to a first embodiment of the present invention.

Next, a description will be made as to an embodiment of the present invention. FIG. 1 is a schematic diagram of a color cathode ray tube display device according to the first embodiment of the present invention. In the figure, reference numeral 1 denotes a color cathode ray tube (CRT) comprised of a neck portion 1a, a funnel portion 1b, and a panel portion 1c. Electron guns, not shown in the figure, are disposed within the neck portion 1a, and an internal magnetic shield, not shown in the figure, is disposed within the funnel portion 1b. Reference numeral 2 denotes a CP-ASSY which is arranged such that it surrounds the outside of the neck portion 1a for making convergence and purity adjustments. The CP-ASSY can make adjustments to three electron beams 8 for the three colors, red, green, and blue so that the three electron beams impinge on the display screen (i.e. the end face) of the CRT at respective proper positions thereof. Reference numeral 3 denotes a deflection yoke disposed around the base part of the neck portion 1a for generating a magnetic field which can deflect the electron beams 8 emitted by the electron guns to above or below the center of the end face of the CRT and/or the left or right of the center, 4 denotes a control circuit for controlling the cycle and amplitude of a sawtooth current, 5 denotes an output circuit for delivering the sawtooth current, 6 denotes a box containing the CRT 1, 7 denotes a wound compensating coil located in the vicinity of the panel section 1c, and 7a denotes a compensating coil attachment for attaching the wound compensating coil 7 in the vicinity of the panel portion 1c of the CRT 1.

Figure 2:
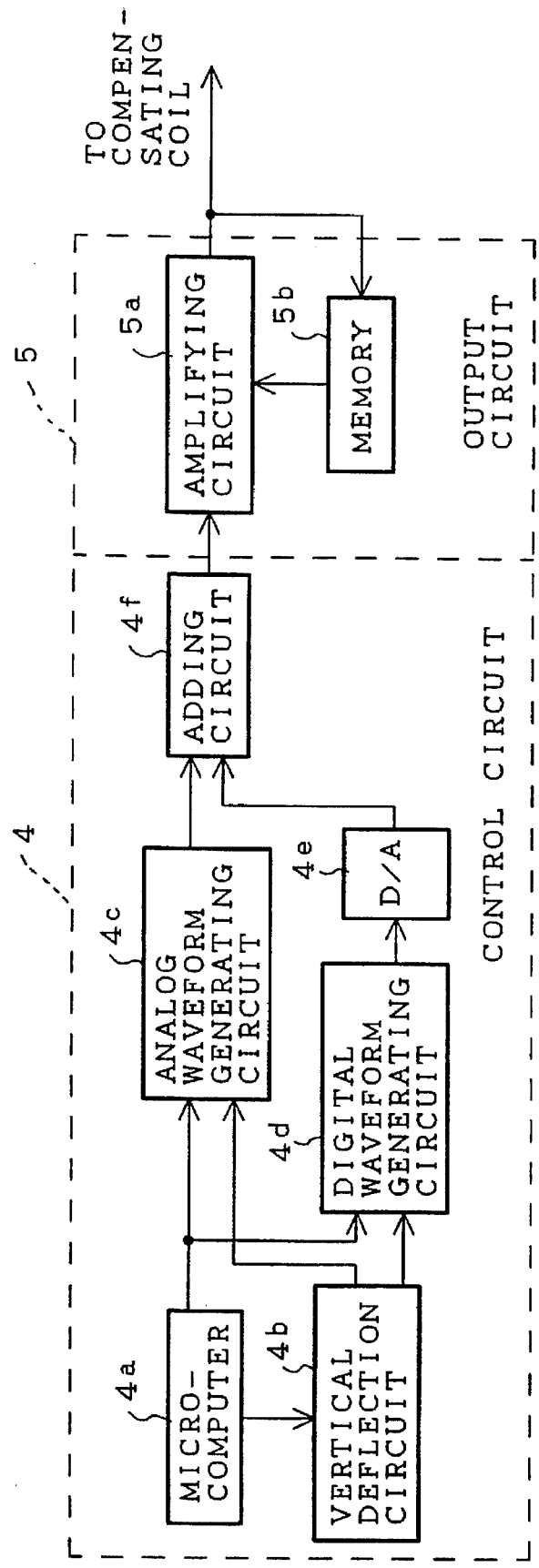
FIG. 2 is a block diagram of a control circuit and an output circuit which construct a current supply unit according to the first embodiment.

Referring now to FIG. 2, it illustrates a block diagram of the control circuit 4 and output circuit 5 which construct a current supply unit according to the first embodiment. The control circuit 4 is comprised of a microcomputer 4a which outputs basic data, a vertical deflection circuit 4b which is activated in response to a start signal from the microcomputer 4a, an analog waveform generating circuit 4c which is activated in response to a trigger signal synchronized with the vertical deflection cycle from the vertical deflection circuit 4b and which receives the basic data from the microcomputer 4a and generates and outputs a signal with a rough waveform, a digital waveform generating circuit 4d which is activated in response to the trigger signal from the vertical deflection circuit 4b and which receives the basic data from the microcomputer 4a and generates and outputs a signal with a fine waveform, a digital-to-analog (abbreviated as D/A) converting circuit 4e which converts a digital output from the digital waveform generating circuit 4d into an analog output, and an adding circuit 4f which add the outputs from the digital waveform generating circuit 4d and D/A converting circuit 4e. Furthermore, the output circuit 5 is comprised of an amplifying circuit 5a which amplifies the output of the adding circuit 4f and a memory 5b which stores the output of the amplifying circuit 5a.

Next, the description will be directed to the operation of the color CRT display device according to this embodiment.

First, a CRT 1 destined for countries in the Northern Hemisphere is properly adjusted by means of the purity (the degree of a match regarding position between each of the electron beams 8 and each of phosphor dots) correction function of the CP-ASSY 2 used for the convergence and purity adjustments in such a manner that the electron beams 8 correctly intersect corresponding phosphor dots arranged in the central region of the display screen of the CRT.

To compensate for moving forces based on the external magnetic field, which are exerted in the same direction on the electron beams going to the upper and lower regions on the screen, after the above adjustment by the CP-ASSY, a sawtooth current having proper amplitudes, which is generated in synchronization with the vertical deflection cycle of a video signal by the control circuit 4 which constructs the current supply unit, is delivered by the output circuit 5 and is then passed through the compensating coil 7 so as to generate a compensating magnetic field which exerts moving forces in the same direction on the electron beams 8 so that they intersect phosphor dots in either the upper region and the lower regions of the face of the CRT.

Figure 3A:
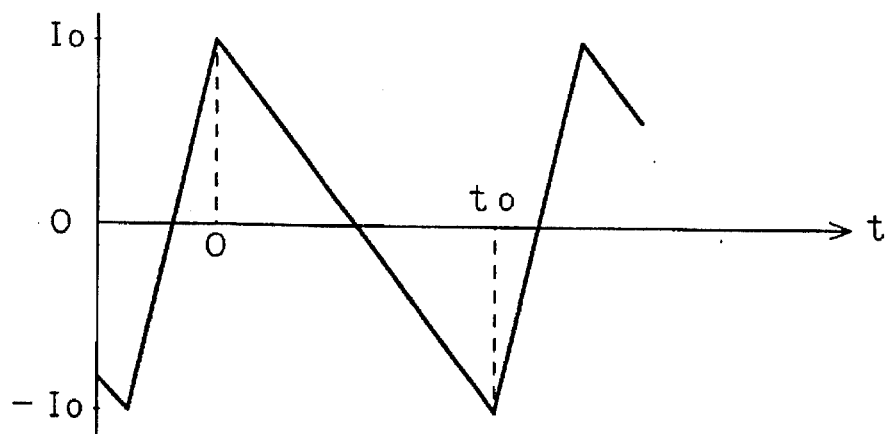
FIGS. 3a, 3b and 3c are diagrams showing examples of the outputs from an analog waveform generating circuit and a D/A converting circuit of the control circuit, and the output circuit.
Figure 3B:
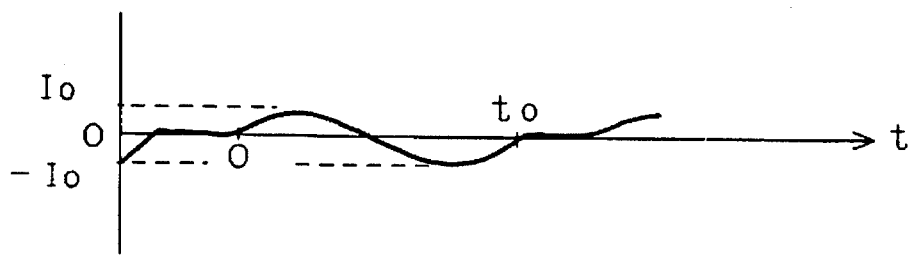
Figure 3C:
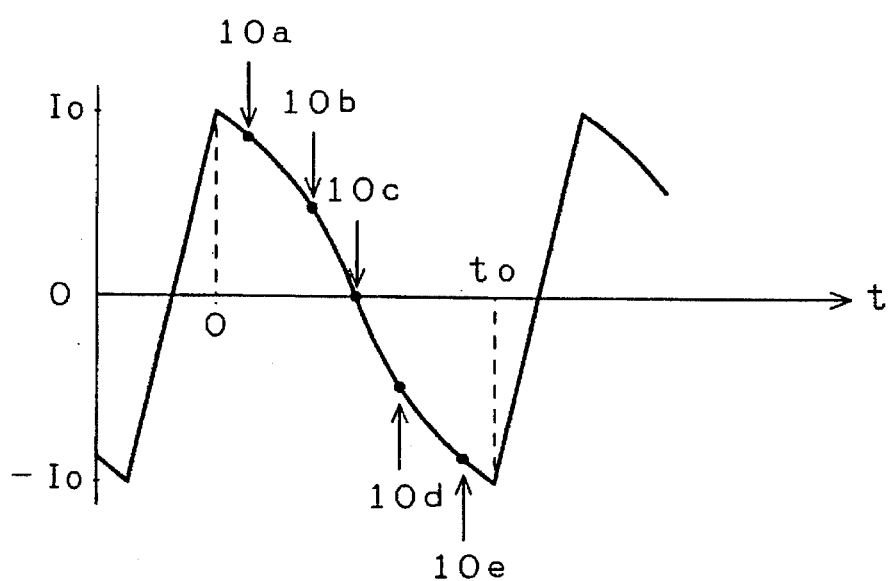

Referring now to FIGS. 3a, 3b and 3c, they illustrate examples of the outputs from the analog waveform generating circuit 4c and D/A converting circuit 4d of the control circuit 4, and amplifying circuit 5a of the output circuit 5. In the CRT 1, as the electron beams move across the screen from left to light, they also move vertically downward. Simultaneously, the amplifying circuit 5a of the output circuit 5 outputs a sawtooth current varying in magnitude, as shown in FIG. 3c, within a vertical scanning period (i.e. $t_0$ in FIG. 3c) during which the electron beams are scanned from the upper left hand corner of the screen to the lower right hand corner of the screen. As mentioned above, the sawtooth current is created by adding the outputs as shown in FIGS. 3a and 3b from the analog waveform generating circuit 4c, D/A converting circuit 4d by means of the adding circuit 4f. When the sawtooth current flows through the compensating coil 7, a compensating magnetic field in a vertical direction on the screen of the CRT 1 is generated. As a result, the electron beams 8 are moved horizontally on the screen of the CRT.

Figure 4:
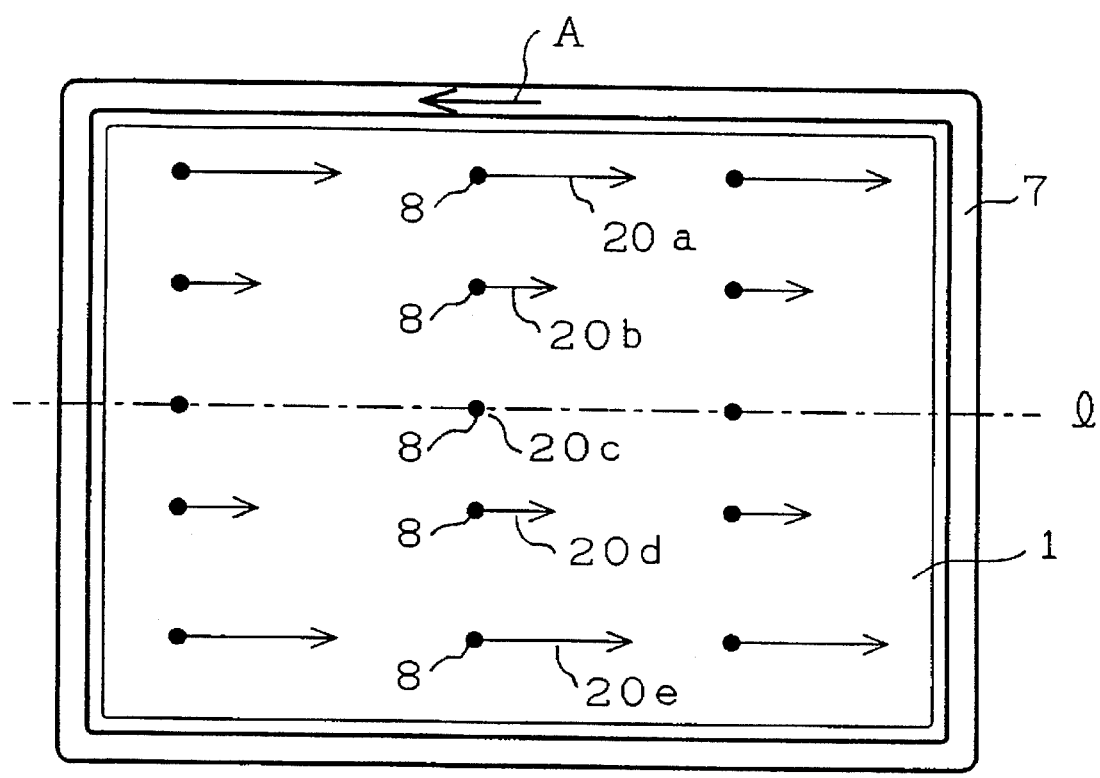
FIG. 4 is a view showing a landing compensation state of the CRT display device of the first embodiment by virtue of a compensating magnetic field generated in the CRT.

Referring now to FIG. 4, it illustrates a view showing a state in which a landing correction is made to the CRT by virtue of a compensating magnetic field generated by the compensating coil in the CRT display device of the first embodiment. In the figure, reference numeral 8 denotes an electron beam which intersects the end face of the CRT. FIG. 4 shows the screen of the CRT when viewed from the outside of the CRT, i.e., the user. Furthermore, reference numerals 20a to 20e correspond to reference numerals 10a to 10e in FIG. 3c, respectively. In FIG. 4, motions of one of the electron beams for the three primary colors, red, green and blue are shown for simplicity.

When the electron beam 8 intersects the upper region of the screen above the horizontal center line L on the screen of the CRT, the sawtooth current as shown in FIG. 3c flows through the compensating coil 7 in the direction of the arrow A in FIG. 4. In this case, since the compensating magnetic field is perpendicular to the screen (i.e. the page of the figure) and is directed upward from the page, when the sawtooth current in the direction of the arrow A decreases in magnitude as indicated by reference numerals 10a and 10b shown in FIG. 3c, the electron beam 8 undergoes a moving force which decreases in magnitude as it moves closer to the center line during the scanning process, as indicated by reference numerals 20a and 20b in FIG. 4, and hence the electron beam 8 travels a distance according to the moving force horizontally toward the right of the screen. When the electron beam 8 intersects the horizontal center line L on the screen of the CRT, the sawtooth current is nearly zero. Therefore, the electron beam undergoes no moving force (20c). Furthermore, when the electron beam 8 intersects the lower region of the screen above the horizontal center line L on the screen of the CRT, the sawtooth current as shown in FIG. 3c flows through the compensating coil 7 in the direction opposite to the direction of the arrow A in FIG. 4. In this case, since the compensating magnetic field is perpendicular to the page of the figure and is directed downward from the page, when the sawtooth current in the opposite direction increases in magnitude as indicated by reference numerals 10d and 10e shown in FIG. 3c, the electron beam 8 undergoes a moving force which increases in magnitude as it moves away from the center line during the scanning process, as indicated by reference numerals 20d and 20e in FIG. 4, and hence the electron beam 8 travels a distance according to the moving force horizontally toward the right of the screen.

Figure 8:
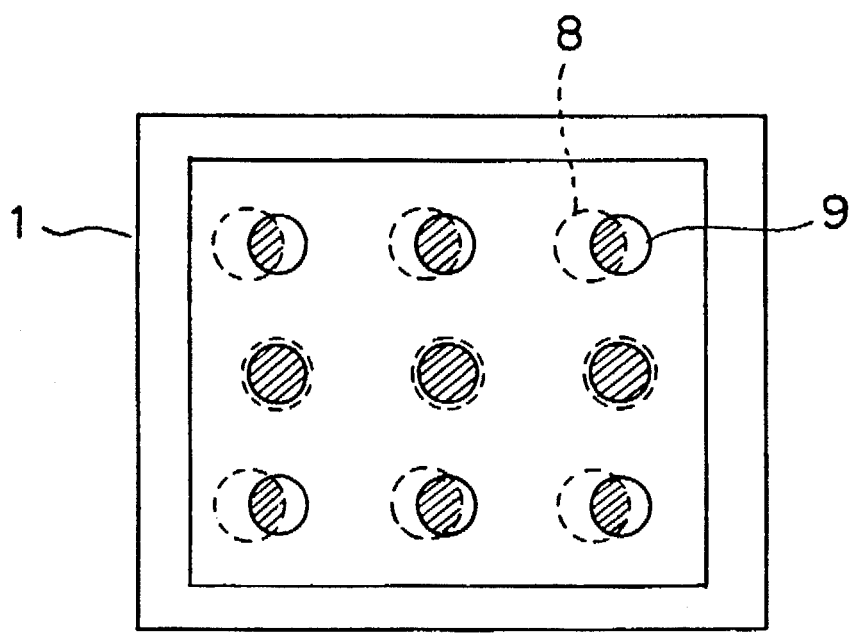
FIG. 8 is view showing the influence of an external magnetic field which acts vertically on a prior art color cathode ray tube display device.

Thus, as shown in FIG. 4, the compensating magnetic field causes moving forces to cancel displacements of the electron beams 8 by the external magnetic field, in the same direction regardless of whether they intersect phosphor dots in either the upper region or lower region of the screen of the CRT. As a result, landing correction is made to the electron beams 8 and hence displacements of the electron beams 8 from the correct phosphor dots 9 as shown in FIG. 8 can be cancelled. In this case, since the magnitude of the sawtooth current which passes through the compensating coil 7 is zero when the electron beams 8 intersect the central area of the display screen of the CRT, no moving force is exerted on each of the electron beams and hence landing correction is not carried out for the central area of the display screen of the CRT. As a result, a proper purity can be obtained and maintained for the whole display screen of the CRT. Then, information about the amplitudes, cycle and so on of the sawtooth current when the proper purity can be obtained is stored in the memory 5b. Thus, the proper purity can be reproduced permanently for the whole display screen of the CRT by passing a sawtooth current through the compensating coil 7 in accordance with the information read out from the memory 5b when the CRT 1 is used.

The control circuit 4 can set the amplitudes, cycle, and so on of the sawtooth current at proper values by adding the outputs of the analog waveform generating circuit 4c which can generate a rough waveform and digital waveform generating circuit 4d which can generate a fine waveform, by means of the adding circuit 4f. Thus, the CRT makes it possible to make a fine adjustment to compensate for variations in purity inherent in the CRT 1. Furthermore, fine adjustments can be made to CRTs destined for various areas such as an area in the Southern Hemisphere and an area in the vicinity of the equator.

Figure 5:
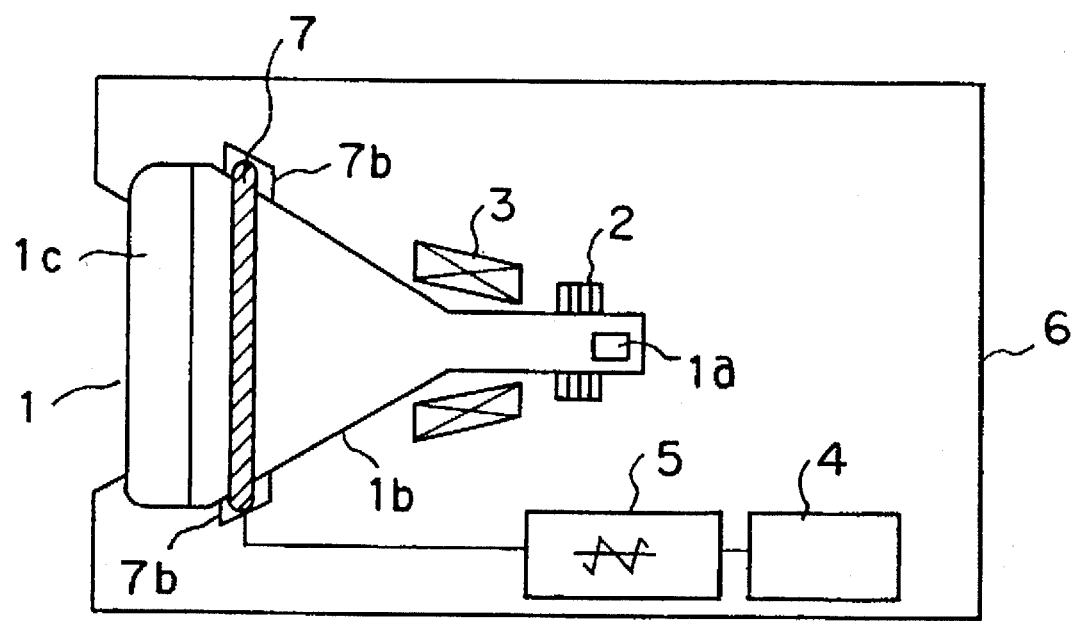
FIG. 5 is a color cathode ray tube display device according to a second embodiment of the present invention.

Referring now to FIG. 5, it illustrates a color cathode ray tube display device according to a second embodiment of the present invention. In the figure, reference numeral 7b denotes a compensating coil attachment for attaching the compensating coil 7 wound in the vicinity of the funnel portion 1b of the CRT 1 to the CRT 1. Since the other structure and operation of the CRT display device are the same as those of the above-mentioned first embodiment, corresponding elements are designated by the same reference numerals as those in FIG. 1 and the duplicated descriptions about the elements will be omitted.

As previously mentioned, according to the second embodiment, since the compensating coil 7 is disposed in the vicinity of the funnel portion 1b such that it is wound around the funnel portion, there is provided an advantage that it is not necessary to increase the diameter of the CRT 1.

Figure 6:
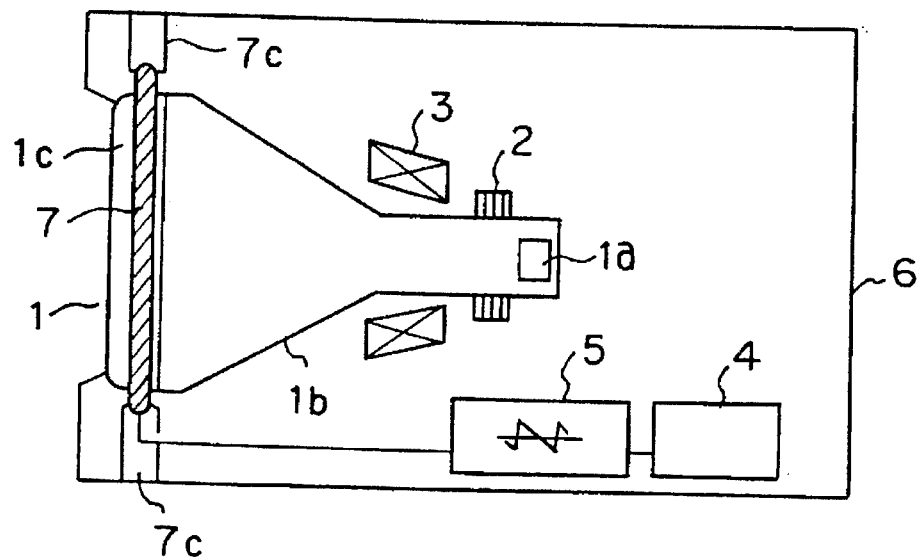
FIG. 6 is a color cathode ray tube display device according to a third embodiment of the present invention.

Referring now to FIG. 6, it illustrates a color cathode ray tube display device according to a third embodiment of the present invention. In the figure, reference numeral 7c denotes a compensating coil attachment for attaching the compensating coil 7, which is disposed in the vicinity of the panel portion 1c of the CRT 1 such that it is wound around the panel portion, to the box 6. Since the other structure and operation of the CRT device are the same as those of the above-mentioned first embodiment, corresponding elements are designated by the same reference numerals as those in FIG. 1 and the duplicated descriptions about the elements will be omitted.

Thus, according to the third embodiment, there is provided an advantage that even if the compensating coil 7 cannot be directly attached to the CRT 1, it can be attached to the CRT display device.

Figure 7:
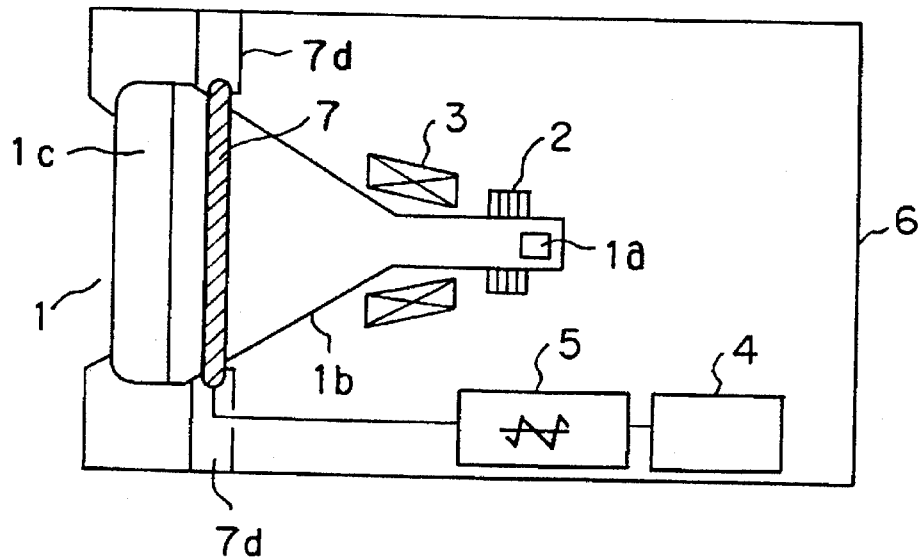
FIG. 7 is a color cathode ray tube display device according to a fourth embodiment of the present invention.

Referring now to FIG. 7, it illustrates a color cathode ray tube display device according to a fourth embodiment of the present invention. In the figure, reference numeral 7d denotes a compensating coil attachment for attaching the compensating coil 7, which is disposed in the vicinity of the funnel portion 1b of the CRT 1 such that it is wound around the funnel portion, to the box 6. Since the other structure and operation of the CRT device are the same as those of the above-mentioned first embodiment, corresponding elements are designated by the same reference numerals as those in FIG. 1 and the duplicated descriptions about the elements will be omitted.

Thus, according to the fourth embodiment, there is provided an advantage that even if the compensating coil 7 cannot be directly attached to the CRT 1, it can be attached to the CRT display device.

As previously mentioned, the present invention can offer the following advantages.

In a preferred embodiment of the present invention, since the color cathode ray tube display device is so constructed that a sawtooth current synchronized with the vertical deflection cycle of a video signal is passed through the compensating coil so that the compensating coil generates a compensating magnetic field for eliminating the influence of an external magnetic field that acts vertically on electron beams which will intersect the display screen of the color cathode ray tube, and information about the sawtooth current, which is passing through the compensating coil and generates the magnetic field for eliminating the influence of the external magnetic field, is stored, displacements of electron beams which will intersect the upper and lower regions of the display screen from corresponding phosphor dots can be corrected and a proper purity can be obtained for the whole of the display screen. Accordingly, color cathode ray tube display devices designed (design of exposure) for the Northern Hemisphere can be used as CRTs destined for an equatorial area or the Southern Hemisphere after the compensation for the earth magnetic field is carried out for the CRTs. Thus, there is provided an advantage that component sharing can be improved and the load on the management of components can be reduced, and hence the cost of manufacturing can be reduced.

In accordance with another embodiment of the present invention, since the color cathode ray tube display device is constructed so that a sawtooth current synchronized with a vertical deflection cycle of a video signal is passed through the compensating coil in the vicinity of the panel portion of the color cathode ray tube so that the compensating coil generates a compensating magnetic field for eliminating the influence of an external magnetic field that acts vertically on electron beams which will intersect the display screen of the color cathode ray tube, and information about the sawtooth current, which passes through the compensating coil and generates the magnetic field for eliminating the influence of the external magnetic field, is stored, there is provided an advantage that the compensating magnetic field for eliminating the influence of an external magnetic field can be generated efficiently.

In accordance with another embodiment of the present invention, since the compensating coil wound in the vicinity of the panel portion is attached to the color cathode ray tube, there is provided an advantage that the compensating magnetic field for eliminating the influence of an external magnetic field can be generated efficiently.

In accordance with another embodiment of the present invention, since the compensating coil wound in the vicinity of the panel portion is attached to a box containing the color cathode ray tube therein, there is provided an advantage that even if the compensating coil cannot be directly attached to the CRT, it can be attached to the CRT display device.

In accordance with another embodiment of the present invention, since the color cathode ray tube display device is constructed so that a sawtooth current synchronized with a vertical deflection cycle of a video signal is passed through the compensating coil in the vicinity of the panel portion of the color cathode ray tube so that the compensating coil generates a compensating magnetic field for eliminating the influence of an external magnetic field that acts vertically on electron beams which will intersect the display screen of the color cathode ray tube, and information about the sawtooth current, which passes through the compensating coil and generates the magnetic field for eliminating the influence of the external magnetic field, is stored, there is provided an advantage that it is not necessary to increase the diameter of the CRT.

In accordance with another embodiment of the present invention, since the compensating coil wound in the vicinity of the funnel portion is attached to the color cathode ray tube, there is provided an advantage that it is not necessary to increase the diameter of the CRT.

In accordance with another embodiment of the present invention, since the compensating coil wound in the vicinity of the funnel portion is attached to a box containing the color cathode ray tube therein, there is provided an advantage that even if the compensating coil cannot be directly attached to the CRT, it can be attached to the CRT display device.

In accordance with the present invention, since there is provided a method of compensating for an external magnetic field acts vertically on electron beams which intersect a display screen of a color cathode ray tube, comprising the steps of: disposing a compensating coil which can generate a compensating magnetic field for eliminating the influence of the external magnetic field; after making convergence and purity adjustments to the cathode ray tube, passing a sawtooth current synchronized with a vertical deflection cycle of a video signal into the compensating coil so that the compensating coil generates the compensating magnetic field so as to exert moving forces act in an identical direction on electron beams which will intersect an upper region and a lower region of the display screen of the color cathode ray tube; correcting displacements of the electron beams from corresponding phosphor dots on the display screen of the color cathode ray tube; and storing information about the sawtooth current used for the correction into a memory, there is provided an advantage that color cathode ray tube display devices designed (design of exposure) for the Northern Hemisphere can be used as CRTs destined for an equatorial area or the Southern Hemisphere after the compensation for the earth magnetic field is carried out for the CRTs.

Many widely different embodiments of the present invention may be constructed without departing from the spirit and scope of the present invention. It should be understood that the present invention is not limited to the specific embodiments described in the specification, except as defined in the appended claims.

What is claimed is:

1. A color cathode ray tube display device comprising:
    a color cathode ray tube including a neck portion, a funnel portion, and a panel portion;
    a compensating coil which generates a compensating magnetic field for eliminating the influence of an external magnetic field that acts vertically on electron beams which will intersect a display screen of said color cathode ray tube;
    a current supply means for passing a sawtooth current synchronized with a vertical deflection cycle of a video signal into said compensating coil so that said compensating coil generates said compensating magnetic field; and
    a memory for storing information about the sawtooth current passing through said compensating coil.

2. The color cathode ray tube display device according to claim 1, wherein said compensating coil is disposed in the vicinity of the panel portion of said cathode ray tube such that said compensating coil is wound around the panel portion.

3. The color cathode ray tube display device according to claim 2, wherein said compensating coil wound in the vicinity of the panel portion is attached to said color cathode ray tube.

4. The color cathode ray tube display device according to claim 2, wherein said compensating coil wound in the vicinity of the panel portion is attached to a box containing said color cathode ray tube therein.

5. The color cathode ray tube display device according to claim 1, wherein said compensating coil is disposed in the vicinity of the funnel portion of said cathode ray tube such that said compensating coil is wound around the funnel portion.

6. The color cathode ray tube display device according to claim 5, wherein said compensating coil wound in the vicinity of the funnel portion is attached to said color cathode ray tube.

7. The color cathode ray tube display device according to claim 5, wherein said compensating coil wound in the vicinity of the funnel portion is attached to a box containing said color cathode ray tube therein.

8. A method of eliminating the influence of an external magnetic field acting vertically on electron beams which intersect a display screen of a color cathode ray tube, comprising the steps of:
    disposing a compensating coil which can generate a compensating magnetic field for eliminating the influence of the external magnetic field;
    after making convergence and purity adjustments to said cathode ray tube, passing a sawtooth current synchronized with a vertical deflection cycle of a video signal into said compensating coil so that said compensating coil generates the compensating magnetic field so as to exert moving forces which act in an identical direction on electron beams which will intersect an upper region and a lower region of the display screen of said color cathode ray tube;
    moving electron beams which will intersect the upper region and lower region of the display screen of said color cathode ray tube in the same direction by means of the compensating magnetic field, thereby correcting displacements of the electron beams from corresponding phosphor dots on the display screen of said color cathode ray tube; and
    storing information about the sawtooth current used for the correction into a memory.

* * * * *